United States Patent
Shi et al.

(10) Patent No.: US 8,260,046 B2
(45) Date of Patent: Sep. 4, 2012

(54) METHOD FOR PIXEL COLOR CORRECTION AND PIXEL COLOR CORRECTING APPARATUS THEREOF

(75) Inventors: Miaohong Shi, Grand Cayman (KY); Amit Mittra, Grand Cayman (KY)

(73) Assignee: Himax Imaging, Inc., Grand Cayman (KY)

( * ) Notice: Subject to any disclaimer, the term of this patent is extended or adjusted under 35 U.S.C. 154(b) by 488 days.

(21) Appl. No.: 12/577,212

(22) Filed: Oct. 12, 2009

(65) Prior Publication Data

US 2011/0085730 A1 Apr. 14, 2011

(51) Int. Cl.
*G06K 9/00* (2006.01)
(52) U.S. Cl. .................... 382/167; 382/162
(58) Field of Classification Search .............. 382/162, 382/167; 348/273, 581; 235/454; 340/5.86; 375/240.25, 240.28; 250/226, 214 C; 345/589, 345/597; 358/1.14, 1.9, 3.27, 3.08
See application file for complete search history.

(56) References Cited

U.S. PATENT DOCUMENTS

| | | | | |
|---|---|---|---|---|
| 6,836,289 B2* | 12/2004 | Koshiba et al. | ............... | 348/273 |
| 6,933,970 B2* | 8/2005 | Koshiba et al. | ............... | 348/273 |
| 6,950,109 B2* | 9/2005 | Deering | ...................... | 345/589 |
| 7,330,209 B2* | 2/2008 | Osamato | ...................... | 348/273 |

* cited by examiner

*Primary Examiner* — Anh Hong Do
(74) *Attorney, Agent, or Firm* — Winston Hsu; Scott Margo

(57) ABSTRACT

A method for pixel color correction includes the steps of determining a gray degree of a designated pixel; generating an adjusted color correction matrix according to the gray degree of the designated pixel; and applying the adjusted color correction matrix to the designated pixel to correct color errors of the designated pixel. The gray degree is generated according to a ratio of the chrominance information to the luminance information. A weighted sum of a reference color correction matrix and a unity matrix is calculated to generate the adjusted color correction matrix, and weighting factors of the reference color correction matrix and the unity matrix are determined by the gray degree, wherein the unity matrix is a fundamental matrix without color correction.

16 Claims, 6 Drawing Sheets

METHOD FOR PIXEL COLOR CORRECTION AND PIXEL COLOR CORRECTING APPARATUS THEREOF

BACKGROUND OF THE INVENTION

1. Field of the Invention

The present invention relates to color correction of image sensors, and more particularly, to a method for pixel color correction and a related apparatus.

2. Description of the Prior Art

CMOS image sensors with RGB color filters are usually non-ideal, and probably may incur errors on human perception. Hence, a color correction is required to correct the spectral response of the image sensors. According to the conventional color correcting method, the same color correction matrix is applied to a whole image in general.

Color correction aims to minimize color errors without boosting noise too much. However, if the same color correction matrix is applied to the whole image, it may cause false color cast in colorful areas or increase noise amplification in gray areas. Hence, how to overcome such problem, resulted from the conventional color correcting method, has become an important topic of the field.

SUMMARY OF THE INVENTION

It is one of the objectives of the claimed invention to provide a method for pixel color correction and a related pixel color correcting apparatus to solve the abovementioned problems.

According to one embodiment, a method for pixel color correction is provided. The method includes the steps of: determining a gray degree of a designated pixel; generating an adjusted color correction matrix according to the gray degree of the designated pixel; and applying the adjusted color correction matrix to the designated pixel to correct color errors of the designated pixel.

According to one embodiment, a pixel color correcting apparatus is provided. The pixel color correcting apparatus consists of a gray degree detector, a first matrix generating circuit, and a color correcting circuit. The gray degree detector determines a gray degree of a designated pixel. The first matrix generating circuit generates an adjusted color correction matrix according to the gray degree of the designated pixel. The color correcting circuit applies the adjusted color correction matrix to the designated pixel to correct color errors of the designated pixel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but not in function. In the following discussion and in the claims, the terms "include", "including", "comprise", and "comprising" are used in an open-ended fashion, and thus should be interpreted to mean "including, but not limited to . . .". The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
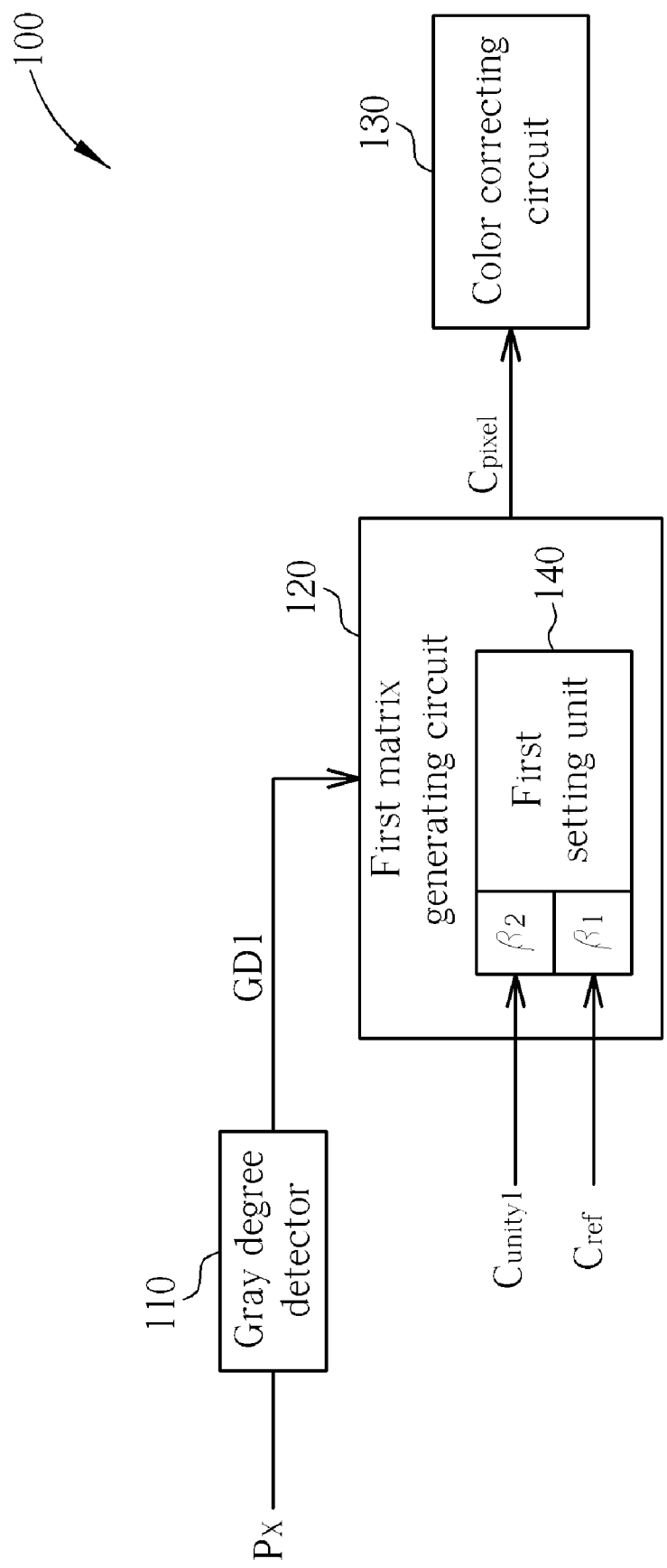
FIG. 1 is a diagram of a pixel color correcting apparatus according to a first embodiment of the present invention.

FIG. 1 is a diagram of a pixel color correcting apparatus 100 according to a first embodiment of the present invention. As shown in FIG. 1, the pixel color correcting apparatus 100 includes, but is not limited to, a gray degree detector 110, a first matrix generating circuit 120, and a color correcting circuit 130. The gray degree detector 110 determines a gray degree GD1 of a designated pixel $P_X$. The first matrix generating circuit 120 generates an adjusted color correction matrix $C_{pixel}$ according to the gray degree GD1 for the designated pixel Px. In this embodiment, the first matrix generating circuit 120 adjusts a reference color correction matrix $C_{ref}$ and a unity matrix $C_{unity1}$ to generate the adjusted color correction matrix $C_{pixel}$, in accordance with the gray degree GD1. Finally, the color correcting circuit 130 applies the adjusted color correction matrix $C_{pixel}$ to the designated pixel $P_X$ to correct color errors of the designated pixel $P_X$. Moreover, the first matrix generating circuit 120 further includes a first setting unit 140 for setting at least one threshold, and for determining a first weighting factor $\beta_1$ and a second weighting factor $\beta_2$ in response to the gray degree GD1. The operations of the gray degree detector 110 and the first matrix generating circuit 120 (including the first setting unit 140) will be explained in more details in the following embodiments.

In one embodiment, the gray degree detector 110 can perform the gray pixel detection upon the designated pixel $P_X$ according to luminance information and chrominance information of the designated pixel $P_X$, so as to generate the gray degree GD1. The gray degree GD1 is determined according to the chrominance information in comparison with the luminance information. As one skilled in the art will appreciate, a YUV color space is related to a RGB color space by the following equations:

$$U=B-Y \qquad (1\text{-}1)$$

$$V=R-Y \qquad (1\text{-}2)$$

$$Y=0.299*R+0.587*G+0.114*B \qquad (1\text{-}3)$$

Therefore, a value of the gray degree GD1 can be set by the following equation:

$$T = \frac{|U| + |V|}{Y} \quad (2)$$

In the equation (2), T represents the value of the gray degree GD1, Y represents the luminance information, and U and V represent the chrominance information. If the value T is close to zero, the designated pixel $P_X$ looks more like a gray pixel, which means that the designated pixel Px contains very few chrominance information.

Please note that the unity matrix $C_{unity1}$ is a fundamental matrix without color correction, wherein the unity matrix $C_{unity1}$ can be represented by the following equation:

$$C_{unity1} = \begin{bmatrix} 1 & 0 & 0 \\ 0 & 1 & 0 \\ 0 & 0 & 1 \end{bmatrix} \quad (3)$$

In this embodiment, the reference color correction matrix $C_{ref}$ has the first weighting factor $\beta_1$ and the unity matrix $C_{unity1}$ has the second weighting factor $\beta_2$, wherein a sum of the first weighting factor $\beta_1$ and the second weighting factor $\beta_2$ is equal to a fixed value. For example, the sum of the first weighting factor $\beta_1$ and the second weighting factor $\beta_2$ is equal to 1, which is also represented by the equation below:

$$\beta_1 + \beta_2 = 1 \quad (4)$$

Therefore, the relationship between the reference color correction matrix $C_{ref}$ the unity matrix $C_{unity1}$, and the adjusted color correction matrix $C_{pixel}$ can be written as:

$$C_{pixel} = \beta_1 * C_{ref} + \beta_2 * C_{unity1} = \beta_1 * C_{ref} + (1 - \beta_1) * C_{unity1} \quad (5)$$

Figure 2:
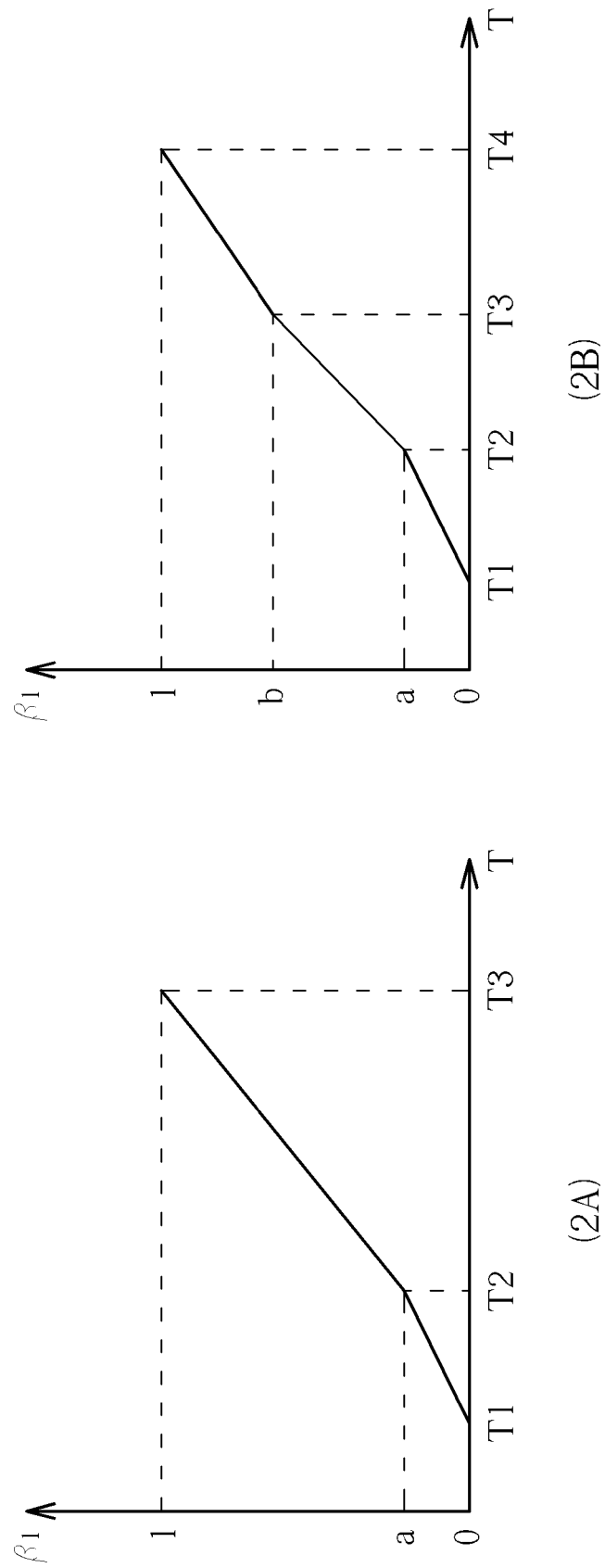
FIG. 2 (including 2A and 2B) is a diagram of an example for illustrating how the first setting unit adjusts the weighting factor of the reference color correction matrix shown in FIG. 1.

Please refer to FIG. 2. FIG. 2 (including 2A and 2B) is a diagram of an example for illustrating how the first setting unit 140 determines the first weighting factor $\beta_1$ of the reference color correction matrix $C_{ref}$ shown in FIG. 1. As shown in 2A, the first weighting factor $\beta_1$ is directly proportional to the value T of the gray degree GD1 and a curve of the first weighting factor $\beta_1$ is divided into three intervals. In this embodiment, three thresholds T1, T2, and T3 are set. When the value T of the gray degree GD1 is smaller than the threshold T1, assign a value "0" to the first weighting factor $\beta_1$. When the value T of the gray degree GD1 lies in-between the threshold T1 and the threshold T2, assign a value [(T−T1)/(T2−T1)×a] to the first weighting factor $\beta_1$. When the value T of the gray degree GD1 lies in-between the threshold T2 and the threshold T3, assign a value [(T−T2)/(T3−T2)×(1−a)+a], wherein the value "a" is less than 1. When the value T of the gray degree GD1 is greater than the threshold T3, assign a value "1" to the first weighting factor $\beta_1$. In a word, the relationship between the first weighting factor $\beta_1$ and the value T of the gray degree GD1 can be written as below:

$$\beta_1 = \begin{cases} 0 & T < T1 \\ (T-T1)/(T2-T1) \times a & T1 \leq T < T2 \\ (T-T2)/(T3-T2) \times (1-a) + a & T2 \leq T < T3 \\ 1 & T \geq T3 \end{cases} \quad (6\text{-}1)$$

As shown in 2B, the first weighting factor $\beta_1$ is directly proportional to the value T of the gray degree GD1 and a curve of the first weighting factor $\beta_1$ is divided into four intervals. In this embodiment, four thresholds T1, T2, T3, and T4 are set. In a word, the relationship between the first weighting factor $\beta_1$ and the value T of the gray degree GD1 can be written as below:

$$\beta_1 = \begin{cases} 0 & T < T1 \\ (T-T1)/(T2-T1) \times a & T1 \leq T < T2 \\ (T-T2)/(T3-T2) \times (b-a) + a & T2 \leq T < T3 \\ (T-T3)/(T4-T3) \times (1-b) + b & T3 \leq T < T4 \\ 1 & T \geq T4 \end{cases} \quad (6\text{-}2)$$

As can be known from FIG. 2, as the value T of the gray degree GD1 gets smaller, assign a smaller value to the first weighting factor $\beta_1$. As the value T of the gray degree GD1 gets larger, assign a larger value to the first weighting factor $\beta_1$. Please note that the value of the first weighting factor $\beta_1$ is not limited to a fixed value, and can be designed depending on actual demands. That is, the values of "a" and "b" shown in FIG. 2 (including 2A and 2B) are not limited. In addition, the number of the thresholds set in the first weighting factor $\beta_1$ is not limited in the present invention. That is, the number of the intervals of the first weighting factor $\beta_1$ should not be considered as limitations of the present invention. The first weighting factor $\beta_1$ can be divided into a plurality of intervals with any positive integer.

By applying the first weighting factor $\beta_1$ listed in the equation (6-1) or (6-2) into the equation (5), the adjusted color correction matrix $C_{pixel}$ can be generated by adjusting the reference color correction matrix $C_{ref}$ and the unity matrix $C_{unity1}$. In other words, piecewise $\beta_1$ provides flexibility to adjust color correction strength for individual pixels, such that both the color fidelity and the noise performance can be simultaneously optimized.

Certainly, the abovementioned pixel color correcting apparatus 100 is merely an exemplary embodiment of the present invention. In other embodiments, more functions are designated into the pixel color correcting apparatus 100. For example, the reference color correction matrix $C_{ref}$ can be adaptively fine-tuned according to different lighting conditions.

Figure 3:
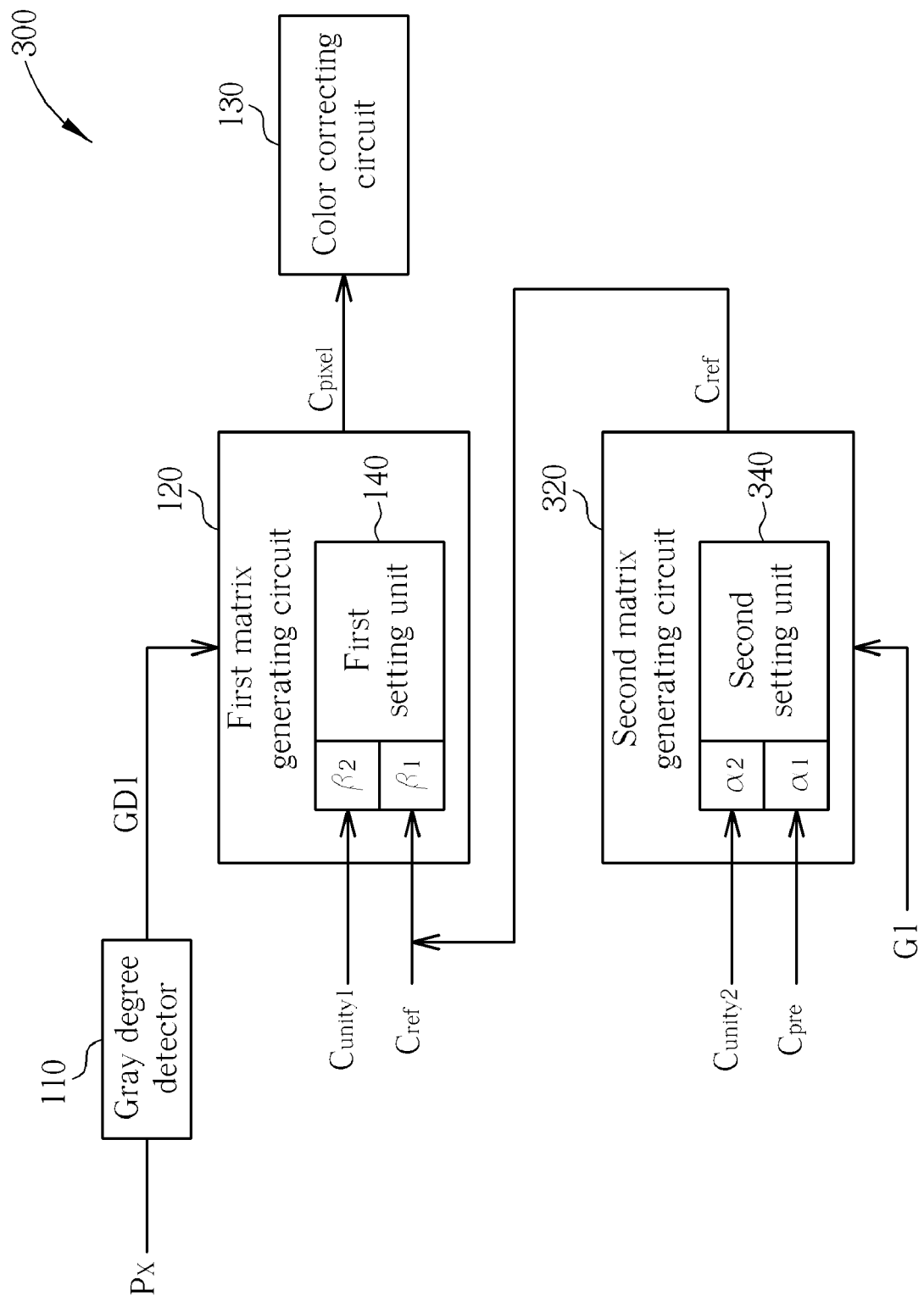
FIG. 3 is a diagram of a pixel color correcting apparatus according to a second embodiment of the present invention.

Please refer to FIG. 3. FIG. 3 is a diagram of a pixel color correcting apparatus 300 according to a second embodiment of the present invention. The architecture of the pixel color correcting apparatus 300 in FIG. 3 is similar to that of the pixel color correcting apparatus 100 in FIG. 1, and the difference between them is that the pixel color correcting apparatus 300 further consists of a second matrix generating circuit 320 for generating the reference color correction matrix $C_{ref}$ according to an actual lighting condition. In this embodiment, the second matrix generating circuit 320 adjusts a pre-defined color correction matrix $C_{pre}$ and a unity matrix $C_{unity2}$ to generate the reference color correction matrix $C_{ref}$. In addition, the second matrix generating circuit 320 further includes a second setting unit 340 for setting at least one threshold, and for determining a first weighting factor $\alpha_1$ and a second weighting factor $\alpha_2$ according to a total gain G1 which is set in response to the actual lighting condition.

Please note that the pre-defined color correction matrix $C_{pre}$ is under a pre-defined lighting condition and the unity matrix $C_{unity2}$ is a fundamental matrix, wherein the unity matrix $C_{unity2}$ can be represented by the following equation:

$$C_{unity2} = \begin{bmatrix} 1 & 0 & 0 \\ 0 & 1 & 0 \\ 0 & 0 & 1 \end{bmatrix} \quad (7)$$

In this embodiment, the pre-defined color correction matrix $C_{pre}$ has the first weighting factor $\alpha_1$ and the unity matrix $C_{unity2}$ has the second weighting factor $\alpha_2$, wherein a sum of the first weighting factor $\alpha_1$ and the second weighting factor $\alpha_2$ is equal to a fixed value. For example, the sum of the first weighting factor $\alpha_1$ and the second weighting factor $\alpha_2$ is equal to 1, which is also represented by the equation below:

$$\alpha_1 + \alpha_2 = 1 \quad (8)$$

Therefore, the relationship between the pre-defined color correction matrix $C_{pre}$, the unity matrix $C_{unity2}$, and the reference color correction matrix $C_{ref}$ can be written as:

$$C_{ref} = \alpha_1 * C_{pre} + \alpha_2 * C_{unity2} = \alpha_1 * C_{pre} + (1-\alpha_1) * C_{unity2} \quad (9)$$

Figure 4:
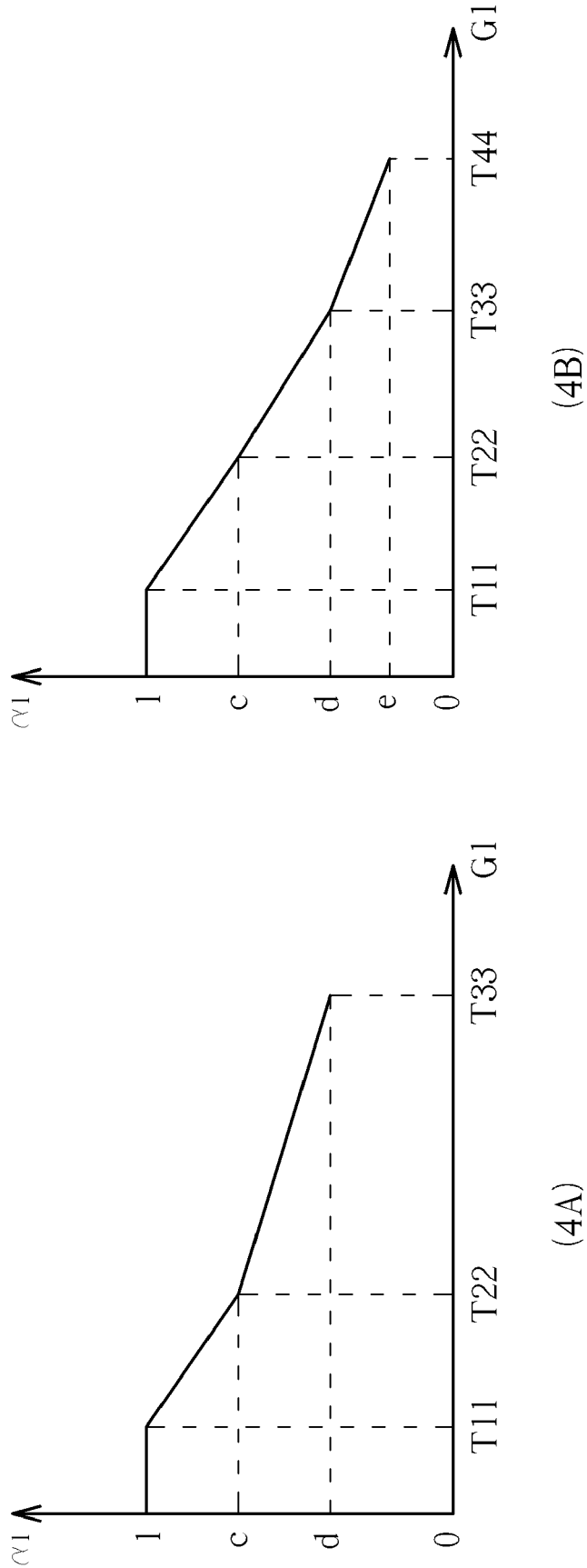
FIG. 4 (including 4A and 4B) is a diagram of an example for illustrating how the second setting circuit adjusts the weighting factor of the pre-defined color correction matrix shown in FIG. 3.

Please refer to FIG. 4. FIG. 4 (including 4A and 4B) is a diagram of an example for illustrating how the second setting unit 340 determines the first weighting factor $\alpha_1$ of the pre-defined color correction matrix $C_{pre}$ shown in FIG. 3. As shown in 4A, the first weighting factor $\alpha_1$ is inversely proportional to the total gain G1 and a curve of the first weighting factor $\alpha_1$ is divided into four intervals. In this embodiment, three thresholds T11, T22, and T33 are set. In a word, the relationship between the first weighting factor $\alpha_1$ and the total gain G1 can be written as below:

$$\alpha_1 = \begin{cases} 1 & G1 < T11 \\ (T22-G1)/(T22-T11) \times (1-c) + c & T11 \le G1 < T22 \\ (T33-G1)/(T33-T22) \times (c-d) + d & T22 \le G1 < T33 \\ d & G1 \ge T33 \end{cases} \quad (10\text{-}1)$$

As shown in 4B, the first weighting factor $\alpha_1$ is inversely proportional to the total gain G1 and a curve of the first weighting factor $\alpha_1$ is divided into five intervals. In this embodiment, four thresholds T11, T22, T33, and T44 are set. In a word, the relationship between the first weighting factor $\alpha_1$ and the total gain G1 can be written as below:

$$\alpha_1 = \begin{cases} 1 & G1 < T11 \\ (T22-G1)/(T22-T11) \times (1-c) + c & T11 \le G1 < T22 \\ (T33-G1)/(T33-T22) \times (c-d) + d & T22 \le G1 < T33 \\ (T44-G1)/(T44-T33) \times (d-e) + e & T33 \le G1 < T44 \\ e & G1 \ge T44 \end{cases} \quad (10\text{-}2)$$

As can be known from FIG. 4, as the total gain G1 gets larger, assign a smaller value to the first weighting factor $\alpha_1$. As the total gain G1 gets smaller, assign a larger value to the first weighting factor $\alpha_1$. Please note that the value of the first weighting factor $\alpha_1$ is not limited to a fixed value, and can be designed depending on actual demands. That is, the values of "c", "d", and "e" shown in FIG. 4 (including 4A and 4B) are not limited. In addition, the number of the thresholds set in the first weighting factor $\alpha_1$ is not limited in the present invention. That is, the number of the intervals of the first weighting factor $\alpha_1$ should not be considered as limitations of the present invention. The first weighting factor $\alpha_1$ can be divided into a plurality of intervals with any positive integer.

By applying the first weighting factor $\alpha_1$ listed in the equation (10-1) or (10-2) into the equation (9), the reference color correction matrix $C_{ref}$ can be generated by adjusting the pre-defined color correction matrix $C_{pre}$ and the unity matrix $C_{unity2}$. In other words, the reference color correction matrix $C_{ref}$ can be adaptively modified according to the total gain G1 which is set in response to the actual lighting condition. Therefore, noise amplification can be avoided as the total gain G1 increases.

Figure 5:
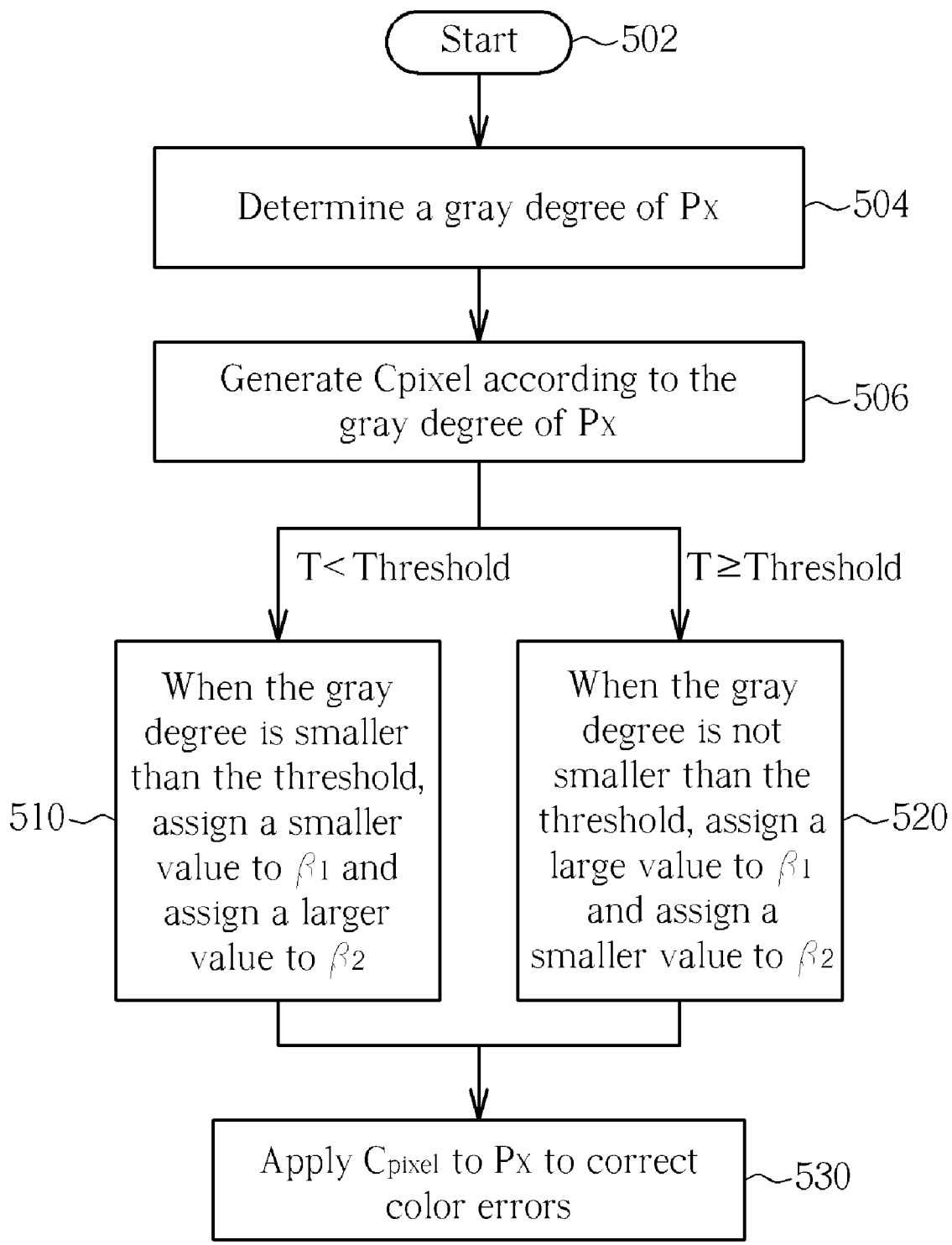
FIG. 5 is a flowchart illustrating a method for pixel color correction according to an exemplary embodiment of the present invention.

Please refer to FIG. 5. FIG. 5 is a flowchart illustrating a method for pixel color correction according to an exemplary embodiment of the present invention. Please note that the following steps are not limited to be performed according to the exact sequence shown in FIG. 5 if a roughly identical result can be obtained. The method includes, but is not limited to, the following steps:

Step 502: Start.

Step 504: Determine a gray degree of a designated pixel.

Step 506: Generate an adjusted color correction matrix according to the gray degree of a designated pixel.

Step 510: When the gray degree is smaller than a threshold, assign a first value to the first weighting factor $\beta_1$ and assign a second value to the second weighting factor $\beta_2$.

Step 520: When the gray degree is not smaller than the threshold, assign a third value to the first weighting factor $\beta_1$ and assign a fourth value to the second weighting factor $\beta_2$, wherein the third value is greater than the first value and the second value is greater than the fourth value.

Step 530: Apply the adjusted color correction matrix to the designated pixel to correct color errors of the designated pixel.

How each element operates can be known by collocating the steps shown in FIG. 5 and the elements shown in FIG. 1 together with the curve shown in FIG. 2. The descriptions of the steps shown in FIG. 5 have already been detailed in the embodiments above, and further description is omitted here for brevity. Be noted that the step 504 is executed by the gray degree detector 110, the steps 506, 510 and 520 are executed by the first matrix generating circuit 120 (including the first setting unit 140), and the step 530 is executed by the color correcting circuit 130.

Figure 6:
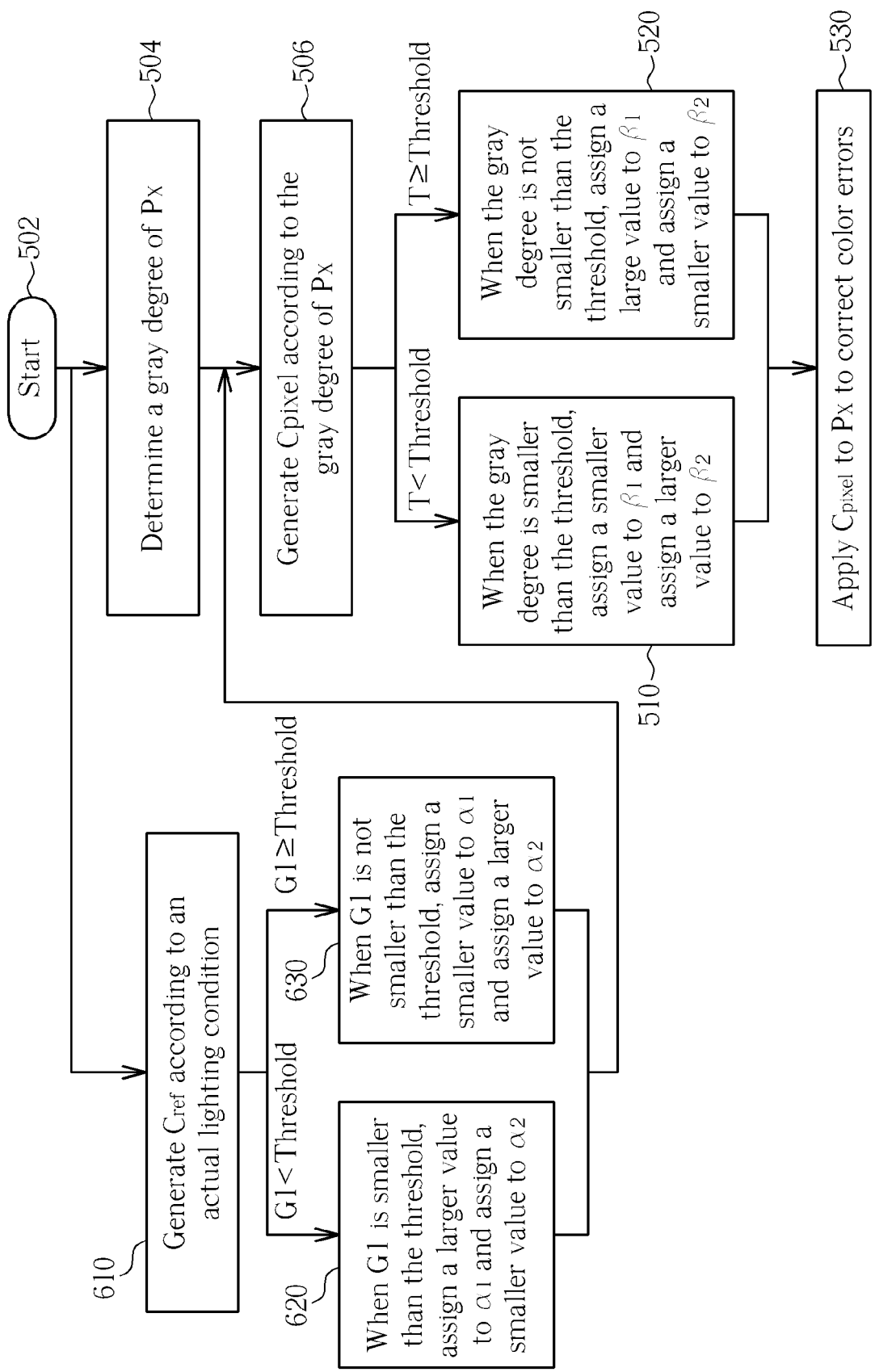
FIG. 6 is a flowchart illustrating a method for pixel color correction according to another exemplary embodiment of the present invention.

FIG. 6 is a flowchart illustrating a method for pixel color correction according to another exemplary embodiment of the present invention. The method includes the following steps:

Step 502: Start.

Step 610: Generate the reference color correction matrix according to an actual lighting condition.

Step 620: When a total gain which is set in response to the actual lighting condition is smaller than the threshold, assign a first value to the first weighting factor $\alpha_1$ and assign a second value to the second weighting factor $\alpha_2$. Go to Step 506.

Step 630: When the total gain which is set in response to the actual lighting condition is not smaller than the threshold, assign a third value to the first weighting factor $\alpha_1$ and assign a fourth value to the second weighting factor $\alpha_2$, wherein the first value is greater than the third value and the fourth value is greater than the second value. Go to Step 506.

Step 504: Determine a gray degree of a designated pixel.

Step 506: Generate an adjusted color correction matrix according to the gray degree of the designated pixel.

Step 510: When the gray degree is smaller than the threshold, assign a first value to the first weighting factor $\beta_1$ and assign a second value to the second weighting factor $\beta_2$.

Step 520: When the gray degree is not smaller than the threshold, assign a third value to the first weighting factor $\beta_1$ and assign a fourth value to the second weighting factor $\beta_2$, wherein the third value is greater than the first value and the second value is greater than the fourth value.

Step 530: Apply the adjusted color correction matrix to the designated pixel to correct color errors of the designated pixel.

Please note that the steps shown in FIG. 6 is similar to that shown in FIG. 5, and the difference between them is that the steps (i.e. the steps 610~630) for adaptively adjusting the reference color correction matrix $C_{ref}$ according to different lighting conditions are added into FIG. 6. How each element operates can be known by collocating the steps shown in FIG. 6 and the elements shown in FIG. 3 together with the curve shown in FIG. 2 and FIG. 4. The descriptions of the steps shown in FIG. 6 have already been detailed in the embodiments above, and further description is omitted here for brevity.

The steps of the flowchart mentioned above are merely a practicable embodiment of the present invention, and should not be taken as a limitation of the present invention. The method can include other intermediate steps or can merge several steps into a single step without departing from the spirit of the present invention.

The abovementioned embodiments are presented merely for describing the present invention, and in no way should be considered to be limitations of the scope of the present invention. In summary, the present invention provides a method for pixel color correction and a related pixel color correcting apparatus. By treating individual pixel differently and by adaptively adjusting the color correction matrix according to individual pixel's property, image noise can be maintained as low as possible. For colorful areas, a stronger color correction is applied to the pixel to minimize color errors. For gray areas, a weaker color correction is applied to the pixel and thus noise amplification can be avoided. That is, piecewise $\beta_1$ provides flexibility to adjust color correction strength for individual pixels, such that both the color fidelity and the noise performance can be simultaneously optimized. In addition, the reference color correction matrix $C_{ref}$ can be adaptively fine-tuned according to the total gain G1 which is set in response to the actual lighting condition. Therefore, noise amplification can be avoided as the total gain G1 increases.

Those skilled in the art will readily observe that numerous modifications and alterations of the device and method may be made while retaining the teachings of the invention.

What is claimed is:

1. A method for pixel color correction, each pixel including luminance information and chrominance information, the method comprising:
   determining a gray degree of a designated pixel;
   using a matrix generating circuit for generating an adjusted color correction matrix according to the gray degree of the designated pixel; and
   applying the adjusted color correction matrix to the designated pixel to correct color errors of the designated pixel.

2. The method of claim 1, wherein the step of determining the gray degree comprises:
   generating the gray degree according to a ratio of the chrominance information to the luminance information.

3. The method of claim 2, wherein the gray degree is set by a following equation:

$$T = \frac{|U|+|V|}{Y},$$

where T represents the gray degree, Y represents the luminance information, and U and V represent the chrominance information.

4. The method of claim 1, wherein the step of using the matrix generating circuit for generating the adjusted color correction matrix comprises:
   calculating a weighted sum of a reference color correction matrix and a unity matrix to generate the adjusted color correction matrix, and weighting factors of the reference color correction matrix and the unity matrix are determined by the gray degree, wherein the unity matrix is a fundamental matrix without color correction.

5. The method of claim 4, wherein the reference color correction matrix has a first weighting factor, the unity matrix has a second weighting factor, the sum of the first weighting factor and the second weighting factor is equal to a fixed value, and the step of using the matrix generating circuit for generating the adjusted color correction matrix comprises:
   setting at least a threshold;
   when the gray degree is smaller than the threshold, assigning a first value to the first weighting factor and assigning a second value to the second weighting factor; and
   when the gray degree is not smaller than the threshold, assigning a third value to the first weighting factor and assigning a fourth value to the second weighting factor, wherein the third value is greater than the first value and the second value is greater than the fourth value.

6. The method of claim 1, further comprising:
   generating the reference color correction matrix according to an actual lighting condition.

7. The method of claim 6, wherein the step of generating the reference color correction matrix comprises:
   calculating a weighted sum of a pre-defined color correction matrix and a unity matrix to generate the reference color correction matrix, and weighting factors of the pre-defined color correction matrix and the unity matrix are determined by the actual lighting condition, wherein the unity matrix is a fundamental matrix.

8. The method of claim 7, wherein the pre-defined color correction matrix has a first weighting factor, the unity matrix has a second weighting factor, the sum of the first weighting factor and the second weighting factor is equal to a fixed value, and the step of using the matrix generating circuit for generating the reference color correction matrix comprises:
   setting at least a threshold;
   when a total gain which is set in response to the actual lighting condition is smaller than the threshold, assigning a first value to the first weighting factor and assigning a second value to the second weighting factor; and
   when the total gain which is set in response to the actual lighting condition is not smaller than the threshold, assigning a third value to the first weighting factor and assigning a fourth value to the second weighting factor, wherein the first value is greater than the third value and the fourth value is greater than the second value.

9. A pixel color correcting apparatus, each pixel including luminance information and chrominance information, the pixel color correcting apparatus comprising:
   a gray degree detector, for determining a gray degree of a designated pixel;

a first matrix generating circuit, for generating an adjusted color correction matrix according to the gray degree of the designated pixel; and a color correcting circuit, for applying the adjusted color correction matrix to the designated pixel to correct color errors of the designated pixel.

10. The pixel color correcting apparatus of claim 9, wherein the gray degree detector generates the gray degree according to a ratio of the chrominance information to the luminance information.

11. The pixel color correcting apparatus of claim 10, wherein the gray degree is set by a following equation:

$$T = \frac{|U|+|V|}{Y},$$

where T represents the gray degree, Y represents the luminance information, and U and V represent the chrominance information.

12. The pixel color correcting apparatus of claim 9, wherein the first matrix generating circuit calculates a weighted sum of a reference color correction matrix and a unity matrix to generate the adjusted color correction matrix, weighting factors of the reference color correction matrix and the unity matrix are determined by the gray degree, and the unity matrix is a fundamental matrix without color correction.

13. The pixel color correcting apparatus of claim 12, wherein the reference color correction matrix has a first weighting factor, the unity matrix has a second weighting factor, the sum of the first weighting factor and the second weighting factor is equal to a fixed value, the first matrix generating circuit further comprises a first setting unit, and the first setting unit is used for:

setting at least a threshold;

assigning a first value to the first weighting factor and assigning a second value to the second weighting factor when the gray degree is smaller than the threshold; and assigning a third value to the first weighting factor and assigning a fourth value to the second weighting factor when the gray degree is not smaller than the threshold, wherein the third value is greater than the first value and the second value is greater than the fourth value.

14. The pixel color correcting apparatus of claim 9, further comprising:

a second matrix generating circuit, for generating the reference color correction matrix according to an actual lighting condition.

15. The pixel color correcting apparatus of claim 14, wherein the second matrix generating circuit calculates a weighted sum of a pre-defined color correction matrix and a unity matrix to generate the reference color correction matrix, weighting factors of the pre-defined color correction matrix and the unity matrix are determined by the actual lighting condition, and the unity matrix is a fundamental matrix.

16. The pixel color correcting apparatus of claim 15, wherein the pre-defined color correction matrix has a first weighting factor, the unity matrix has a second weighting factor, the sum of the first weighting factor and the second weighting factor is equal to a fixed value, the second matrix generating circuit further comprises a second setting unit, and the second setting unit is used for:

setting at least a threshold;

assigning a first value to the first weighting factor and assigning a second value to the second weighting factor when a total gain which is set in response to the actual lighting condition is smaller than the threshold; and assigning a third value to the first weighting factor and assigning a fourth value to the second weighting factor when the total gain which is set in response to the actual lighting condition is not smaller than the threshold, wherein the first value is greater than the third value and the fourth value is greater than the second value.

* * * * *